स009173224B2

United States Patent
Cai et al.

(10) Patent No.: US 9,173,224 B2
(45) Date of Patent: Oct. 27, 2015

(54) SYSTEM AND METHODS FOR DIFFERENTIATED ASSOCIATION SERVICE PROVISIONING IN WIFI NETWORKS

(71) Applicant: FutureWei Technologies, Inc., Plano, TX (US)

(72) Inventors: Lin Cai, Schaumburg, IL (US); George Calcev, Hoffman Estates, IL (US); Bin Chen, Schaumburg, IL (US); Lukasz Krzymien, Rolling Meadows, IL (US)

(73) Assignee: Futurewei Technologies, Inc., Plano, TX (US)

( * ) Notice: Subject to any disclaimer, the term of this patent is extended or adjusted under 35 U.S.C. 154(b) by 164 days.

(21) Appl. No.: 13/781,380

(22) Filed: Feb. 28, 2013

(65) Prior Publication Data
US 2013/0229995 A1     Sep. 5, 2013

Related U.S. Application Data

(60) Provisional application No. 61/605,520, filed on Mar. 1, 2012.

(51) Int. Cl.
*H04W 4/00*     (2009.01)
*H04W 72/10*     (2009.01)
(Continued)

(52) U.S. Cl.
CPC .......... *H04W 72/10* (2013.01); *H04W 52/0216* (2013.01); *H04W 52/0219* (2013.01); *H04W 52/0229* (2013.01); *H04W 74/0875* (2013.01)

(58) Field of Classification Search
CPC ....................................................... H04W 72/10
USPC .......................................................... 370/329
See application file for complete search history.

(56) References Cited

U.S. PATENT DOCUMENTS

| 8,069,465 | B1 | 11/2011 | Bartholomay et al. |
| 2005/0180385 | A1 | 8/2005 | Jeong et al. |
| 2007/0195787 | A1 | 8/2007 | Alnuweiri et al. |

(Continued)

FOREIGN PATENT DOCUMENTS

| EP | 2259509 A1 | 12/2010 |
| JP | 2007053524 A | 3/2007 |

(Continued)

OTHER PUBLICATIONS

Yunoki, K., et al., "Probe Request and Response in TGai," IEEE 11-11/1414r2, Nov. 2, 2011, pp. 1-15.

(Continued)

*Primary Examiner* — Shripal Khajuria
(74) *Attorney, Agent, or Firm* — Slater & Matsil, L.L.P.

(57) ABSTRACT

A system and methods are provided to enable differentiated association of stations (STAs) in a WiFi system and provide differentiated quality of service (QoS) based association. The embodiments include categorizing STAs that share a channel of the WiFi network into different association priority classes, wherein the STAs with higher association priority classes wait for shorter times before starting association with an access point (AP) over the shared channel. The association priority classes are assigned by the AP or the WiFi network and signaled to the STAs. Alternatively, the association priority classes are assigned by the STAs and indicated to the AP or the WiFi network. The association priority class is determined for a STA according to traffic type, device type, subscriber type, or a random number generator.

24 Claims, 3 Drawing Sheets

(51) Int. Cl.
   *H04W 74/08*   (2009.01)
   *H04W 52/02*   (2009.01)

(56) References Cited

U.S. PATENT DOCUMENTS

| | | | |
|---|---|---|---|
| 2008/0240049 A1 | 10/2008 | Gaur | |
| 2010/0150116 A1 | 6/2010 | Ji et al. | |
| 2010/0157962 A1 | 6/2010 | Koo et al. | |
| 2013/0142118 A1* | 6/2013 | Cherian et al. | 370/328 |

FOREIGN PATENT DOCUMENTS

| | | | |
|---|---|---|---|
| JP | 2007325213 | A | 12/2007 |
| JP | 2008245278 | A | 10/2008 |
| JP | 2008258734 | A | 10/2008 |
| WO | 2010132248 | A1 | 11/2010 |
| WO | 2011095669 | A1 | 8/2011 |

OTHER PUBLICATIONS

Barber, P., et al., "GAS Version Control in 11ai," IEEE 802.11-11/1498-01-00ai, Oct. 24, 2011, pp. 1-16.

Barber, P., et al., "GAS Query Optimization in 11ai," IEEE 802.11-11/1499-00-00ai, Oct. 24, 2011, pp. 1-13.

Fang, P., et al., "IEEE P802.11 Wireless LANs: Specifications Framework for TGai," Nov. 14, 2012, pp. 1-13.

Liu, Y., "2007+ STA Support," 20111024r0 Marvell 2007+ STA Support, Oct. 24 2011, pp. 1-7.

Hamiti, S., "The Draft IEEE 802.16m System Description Document," IEEE 802.16m-08/003r1, Apr. 30, 2008, 30 pages.

International Search Report and Written Opinion received in International Application No. PCT/CN2013/072057, mailed Jun. 6, 2013, 12 pages.

Supplementary European Search Report received in Application No. 13755456.4-1857, mailed Jan. 12, 2015, 6 pages.

IEEE, IEEE Standard for Information Technology—Telecommunications and Information Exchange Between Systems-Local and Metropolitan Area Networks-Specific Requirements-Part 11: Wireless LAN Medium Access Control (MAC) and Physical Layer (PHY) Specifications, Amendment 8: Medium Access Control (MAC) Quality of Service Enhancements, IEEE Std 802.11e, Nov. 2005, 211 pages.

Office Action with English translation received in Korean Application No. 10-2014-7026941 dated May 28, 2015, 12 pages.

* cited by examiner

SYSTEM AND METHODS FOR DIFFERENTIATED ASSOCIATION SERVICE PROVISIONING IN WIFI NETWORKS

This application claims the benefit of U.S. Provisional Patent Application Ser. No. 61/605,520, filed on Mar. 1, 2012, and entitled "System and Method for Differentiated Association Service Provisioning in WiFi Networks," which application is incorporated herein by reference.

TECHNICAL FIELD

The present invention relates to a system and method for wireless communications, and, in particular embodiments, to a system and methods for differentiated association service provisioning in WiFi networks.

BACKGROUND

WiFi, also referred to as wireless local area network (WLAN), uses IEEE 802.11 standard technologies as its air interface. With increased network capacity and advances in communication technologies, IEEE 802.11 or WiFi systems are expected to support a larger number of stations (STAs). Accordingly, access points (APs) should be capable of handling a larger number of communication requests simultaneously, e.g., when mobile devices enter or leave the WiFi domains. For example, in a train station, when the train stops, many WiFi users that are video streaming or browsing the internet may come out from the train at the same time and try to associate with the AP in the train station to continue their video streaming or Internet browsing. In another example, multiple smart meters in a power outage area may transmit a 'last gasp' notification message to alert the distributor to their loss of power. After a long power outage, devices including smart meters may also try to re-associate with an AP at about the same time. In a WLAN, a communication channel can be shared by multiple STAs. However, a large number of simultaneous communications can cause collisions in the shared channel and result in a long channel access delay. An overly long access delay may cause more energy consumption in the mobile devices and jeopardize the quality of service (QoS) provisioning of different services on different STAs. Therefore, there is a need to consider QoS-aware network association in a WiFi system.

SUMMARY OF THE INVENTION

In one embodiment, a method for providing differentiated association in a WiFi network includes assigning different association priority classes to a plurality of stations (STAs) that share a channel of the WiFi network, wherein the STAs with higher association priority classes wait for shorter times before starting association with an AP over a shared channel.

In another embodiment, a method for providing differentiated association in a WiFi network includes determining, at a STA, an association priority class for the STA, entering a sleep mode for a duration time corresponding to the determined association priority class, and starting an association procedure between the STA and an access point (AP) of the WiFi network after the duration time ends.

In another embodiment, an AP component configured to support differentiated association in a WiFi network includes a processor and a computer readable storage medium storing programming for execution by the processor. The programming includes instructions to assign different association priority classes to a plurality of STAs that share a channel of the WiFi network, wherein STAs of higher association priority classes wait for a shorter time before attempting association with an AP over a shared channel.

In yet another embodiment, a STA configured to support differentiated association in a WiFi system includes a processor and a computer readable storage medium storing programming for execution by the processor. The programming includes instructions to enter a sleep mode for a duration time corresponding to an association priority class assigned to the STA, and start an association procedure between the STA and an AP of the WiFi network after the duration time ends.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In an 802.11 WLAN, a communication channel with an AP can be shared by multiple STAs coordinated by a distributed channel access function, referred to as a distributed coordination function (DCF). The DCF is based on a carrier sense multiple access with collision avoidance (CSMA/CA) mechanism. The DCF uses both physical and virtual carrier sense functions to determine the state of the channel. The physical carrier sense resides in the physical layer (PHY) and uses energy detection and preamble detection to determine whether the channel is busy. The virtual carrier sense resides in the media access control layer (MAC) and uses reservation information, e.g., in a Duration field of a MAC header, which indicates the impeding use of the wireless channel. The wireless channel generally is determined to be idle (not busy) when both the physical and virtual carrier sense mechanisms indicate it to be so.

Figure 1:
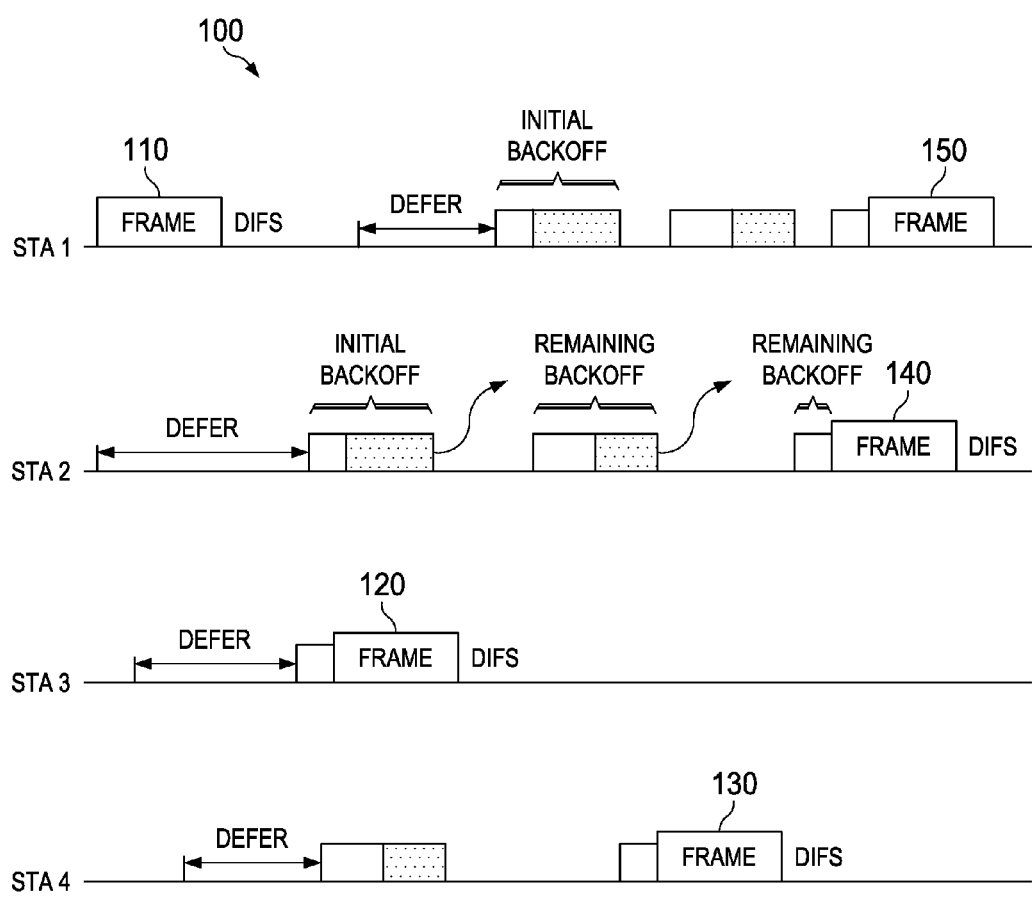
FIG. 1 illustrates a distributed channel access (DCA) scheme.

FIG. 1 shows a distributed channel access (DCA) scheme 100 for a WiFi or 802.11 WLAN system. The scheme 100 involves a plurality of STAs (e.g., STA1, STA2, STA3, and STA4) that share a channel to transmit their data frames, e.g., to an AP. A STA with a data frame for transmission first performs a clear channel assessment (CCA) by sensing the wireless channel for a fixed duration, referred to as a DCF inter-frame space (DIFS). If the wireless channel is busy with a data frame transmission of another STA, then the sensing STA waits until the channel remains idle for a DIFS period of time. For example, after transmitting a data frame 110, STA1 waits for a DIFS period of time during which the channel remains idle before attempting to transmit a second data frame over the channel.

After waiting for a DIFS, the STA waits further for a "backoff" period before attempting to transmit another frame if the channel is sensed busy during DIFS This can be implemented by a backoff timer that decreases by one time unit at a time after detecting the channel to be idle (free of data frame transmission), until the backoff timer reaches zero. During the backoff time, the timer is paused whenever the channel is sensed busy. For example, STA1 starts the backoff timer when the channel becomes idle for a DIFS. In other words, STA1 defers starting the backoff time until the end of the transmission of frame 120 from STA2. After starting the backoff time, STA1 pauses the timer during the backoff time when a new data frame 130 is transmitted by STA4 on the channel. When the channel becomes idle again for a DIFS time duration, the STA restarts the timer to continue decreasing the remaining backoff time. For example, STA1 continues decreasing the backoff time after the data frame 130 is transmitted, but pauses the timer again when another data frame 140 from STA2 is detected on the channel, and resumes the timer after a DIFS duration from completing data frame 140 transmission. When the backoff timer reaches zero, the STA starts transmitting its data frame if the channel is idle. For example, SAT1 transmits another data frame 150 after the remaining backoff time reaches zero and no other data frame is detected on the channel.

Figure 2:
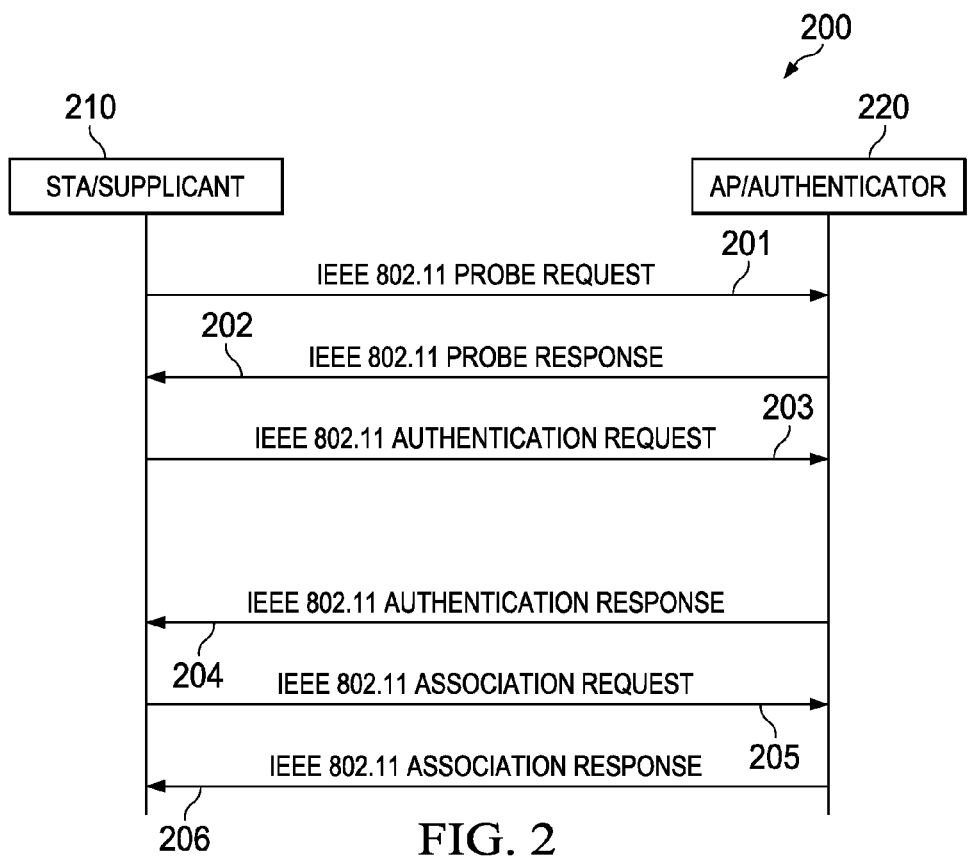
FIG. 2 illustrates a network link association and authentication procedure.

FIG. 2 illustrates a network link association and authentication procedure 200 according to IEEE 802.11. The procedure is established between a STA 210 and an AP 220, for example between a mobile device and a WiFi modem. The STA 210 first sends a probe request 201, which can be intercepted by the AP 220. Upon receiving a probe response 202 from the AP 220, the STA 210 transmits an authentication request 203 to the AP 220. The AP 220 then authenticates the STA 210 or forwards the request to an authentication server (not shown), and sends back an authentication response 204 to the STA 210. After authentication is completed, the STA 210 can initiate network association by a handshaking process with the AP 220, via association request 205 and response 206 message exchanges. In some scenarios, the association procedure 200 can skip the probe request 201/response 202 exchange if the necessary information is broadcasted in a beacon from the PA 220 and received/decoded by the STA 210.

In real network scenarios, when a large number of devices attempt network association in a burst manner (e.g., at about the same time), not all flows can successfully associate with the AP during a certain time interval due to the limited capacity of the network, such as contention on a shared channel. In such cases, it is important to ensure that higher priority devices can associate first with the AP. A system and methods are provided herein for achieving QoS-aware network association, e.g., to provision differentiated services for STAs carrying different types of applications in a WiFi system. The term association is used to indicate the initiation and authentication of STAs with an AP to access a WiFi network and begin WiFi communications, such as in the procedure 200. The term association used herein also includes similar actions, such as re-association of STAs with an AP or handover of STAs between APs or networks. The embodiment methods and schemes described below and applied to such association actions can also be similarly used for other suitable functions, such as emergency signaling.

An 802.11 network may comprise different types of STAs with different applications. For instance, some of the STAs may include sensor devices, e.g., temperature sensors, smoke sensors, and/or electrical meters, while other STAs may include offloading devices, such as smart phones, laptops, and/or computer tablets. The sensor devices may be designed for some applications with relatively high QoS requirements. For example, smart meters record the consumed electric energy and transmit the recorded data periodically. However, when the smart meters detect a power outage, the meters need to transmit a 'last gasp' message (to the AP or network) to notify the distributor as soon as possible. Offloading devices can use different applications with different QoS requirements. For example, a phone call that undergoes a handover from a cellular network to a WiFi network requires a minimal (pre-defined) handover delay to ensure call quality, while a file transfer or software update can tolerate relatively long delays. Due to the contention nature of the 802.11 system (e.g., on the shared channel), when a large number of STAs need to associate with the AP and not all requests can be satisfied in a relatively short time interval, providing differentiated quality of service association is needed to guarantee faster association for STAs with critical applications (e.g., with higher priority QoS requirements).

In an embodiment, a system and methods are implemented to provide QoS based association via allocation of association priority class to each WiFi device. The embodiment system includes categorizing the STAs into a number N of classes of association priorities. For instance, 4 classes may be considered, including a first class that represents devices that require fast association, such as a phone in a handover procedure (between APs or between a cellular network and a WiFi network) or a sensor device carrying critical messages, e. g. a 'last gasp' notification or a gas leakage alarm. The classes may include a second class that represents devices which have real time interactive traffic, such as for electronic payment. A third class may represent devices that can tolerate a relatively longer association delay, such as smart phones sending/receiving emails or sensor devices communicating regular (non-urgent) data reports. A fourth class may represent other devices with best effort traffic that do not have delay requirement. The priority class can be determined by the applications running or carried on the devices. If a device carries multiple types of applications, then the priority can be determined by the highest priority of these applications. In addition, when an application changes, e.g., when a voice call of a device terminates, the priority of the device is updated accordingly, based on the device's current applications. Alternatively, the STAs are categorized into different classes based on the STA types or subscribers' priorities, or a random number generator. Different STA types or subscribers' priorities have different association priorities. The STAs can also be categorized into different classes based on any combination of the above factors with different weights. For example, the applications can be given higher weight that then the STA types or subscribers' priorities.

Different embodiment methods may be used to categorize the STAs. For instance, an AP of the system can configure the association priority of a STA. Alternatively, a STA of the system can select an association priority based on its application, device type, subscriber's priority, or a random number generated by device, as described above. For example, a higher priority subscriber can have a higher priority for association.

In an embodiment method, a minimum wait duration, denoted as $t\_n$, is assigned for each STA of class n, where n is an integer that indicates a class of association priority, for example n=0, 1, 2, or 3 for a total of 4 classes of association priorities. A STA of class n waits at least $t\_n$ before proceeding to or attempting to associate with an AP (e.g., if the shared channel is idle). For 4 classes, for example, 4 minimum wait durations are assigned such that $t\_0 < t\_1 < t\_2 < t\_3$, where a first period [t_0, t_1] is reserved for class 0. This means that only the first or highest association priority class can associate with an AP during this period. During a subsequent period [t_1, t_2], both class 0 and class 1 (the next highest association priority class) can associate with the AP. Similarly, class 0, 1, and 2 can associate with the AP during the subsequent period [t_2, t_3], and all STAs can associate after t_3. The timer t_n may reside in the MAC layer of the STA and is not necessarily dependent on the accuracy of the physical time. To facilitate fast association, the wait duration t_0 can be set to 0, so that class 0 STAs can proceed immediately to associate with the AP.

The wait durations t_1, t_2, and t_3 can be pre-determined system parameters, can be determined by the AP, or can be configured by the operator or application. These parameters can be broadcasted or uni-casted by the AP to the STAs. When the parameters are determined by the AP, the AP can adjust the parameter t_n according to the estimated network situation or conditions, and broadcast the t_n for each class of association priority in the beacon frame or other information elements (IEs). A STA of association class n may go to sleep and wake up after the corresponding duration t_n. The STA may then starts a network association procedure based on a CSMA/CA mechanism, such as the scheme 100. As described above, during the period [t_n−1, t_n] for n>1, one or more classes may contend for association. In other embodiments, the STA can use an enhanced distributed channel access (EDCA) mechanism with different arbitrary inter-frame spaces (AIFSs) and contention windows (CWs) instead of CSMA/CA to further improve the differentiated association services.

In another embodiment method, a differentiated backoff window is used for achieving QoS-aware network association. Specifically, each class is associated with a backoff time window, denoted as W_n. For example, 4 backoff time windows are assigned such that $W\_0<W\_1<W\_2<W\_3$ for n=4 association classes. The parameters W_n can be pre-determined system parameters, or can be determined by the AP via some broadcast messages, such as beacons or any other IEs. A STA of class n can randomly select a time t_n from the window W_n, e.g., $0 \le t\_n \le W\_n$, or $t\_n \in [0, W\_n]$. The STA then goes to sleep and wake up after t_n. In this way, statistical priority can be achieved for different classes. In other words, a higher priority class has a greater probability to associate with the AP sooner than other classes. To further improve the probability and provide a stricter priority association, different random window assignment schemes can be used. For example, STAs of class n (n≥1) can also select t_n from [W_n−1, W_n] for n≥1, and STAs of class 0 select t_0 from [0, W_0] for n=0. In this way, a STA of a low priority class is less likely to transmit before a STA with a high priority class. After waking up, a STA can initiate a network association procedure based on CSMA/CA or EDCA.

In the WiFi system, a STA can be used to carry various types of traffic and the traffic itself can tolerate various delay (latency) values. Thus, the association priority, e.g., in the embodiment methods above, can be changed dynamically via requests from the application layer or at the MAC layer via inspection of the buffered types of traffic. For instance, if a MAC layer detects that voice traffic packets are buffered (for voice communications), then the MAC layer can upgrade an initial lower association priority (for normal traffic) to a higher priority accordingly. Similarly, if low priority traffic is detected, then the MAC layer can reduce the association priority accordingly.

In another embodiment, the association priority is changed dynamically based on information provided by an AP. To take into account the changing nature of traffic, the AP can override the STA association priority by sending a re-map between current STA priorities and new allocated priorities. The AP can notify one or more classes of STAs for association at different times. In a different embodiment, a pseudo-random change of priority is used, where a STA uses some random number generator to alter its association priority. For instance, a STA generates a random number to decide its association priority, or generates a random number and compares the number to a threshold (e.g., provided by the operator or AP) and then decides to increase or decrease the association priority if the random number generator is larger than the threshold.

In an embodiment system, the wireless network includes a plurality of APs operating in the same or different channels, where each AP accepts one or more different association priorities of other APs. For instance, a first AP accepts requests with association priority 0 and 1, while a second AP accepts request only for devices with association priority 2, 3, 4, etc. This approach can offer a better match between AP characteristics such as latency/throughput and the incoming association requests.

Figure 3:
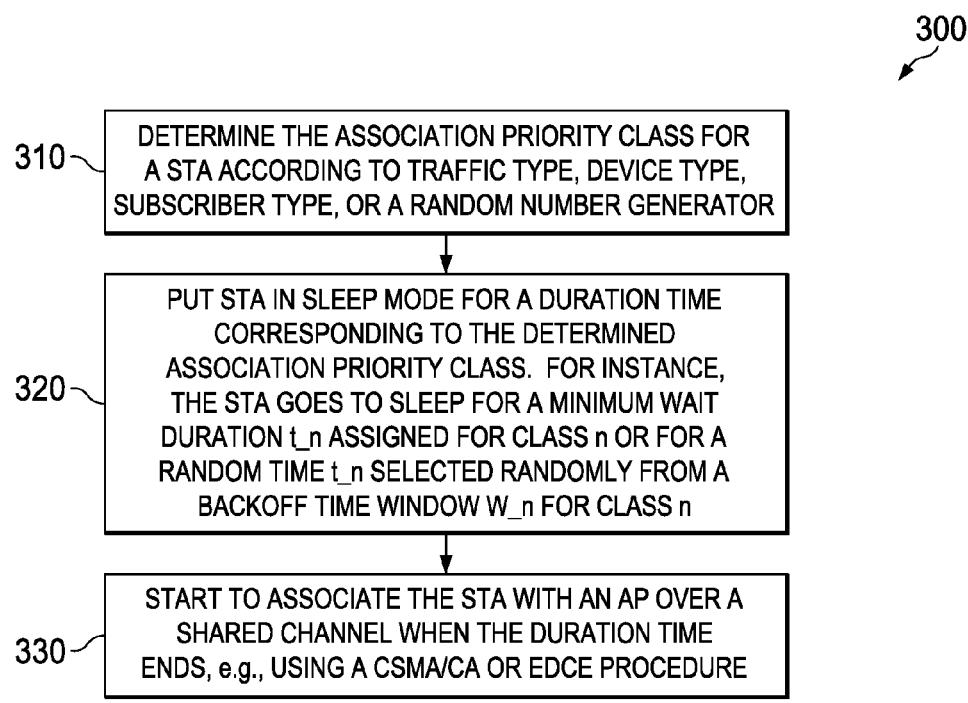
FIG. 3 illustrates an embodiment method to provide QoS based association.

FIG. 3 shows an embodiment method 300 to provide QoS based association via allocation of association priority class to each WiFi device. At step 310, the method 300 determines the association priority class for a STA according to traffic type, device type, subscriber type, or a random number generator, as described above. At step 320, the STA goes to sleep for a duration time corresponding to the determined association priority class. For instance, the STA is put in sleep mode for a minimum wait duration t_n assigned for class n or for a random time t_n selected randomly from a backoff time window W_n for class n. At step 330, start to associate the STA with an AP over a shared channel when the duration time ends, e.g., using a CSMA/CA or EDCE procedure.

Figure 4:
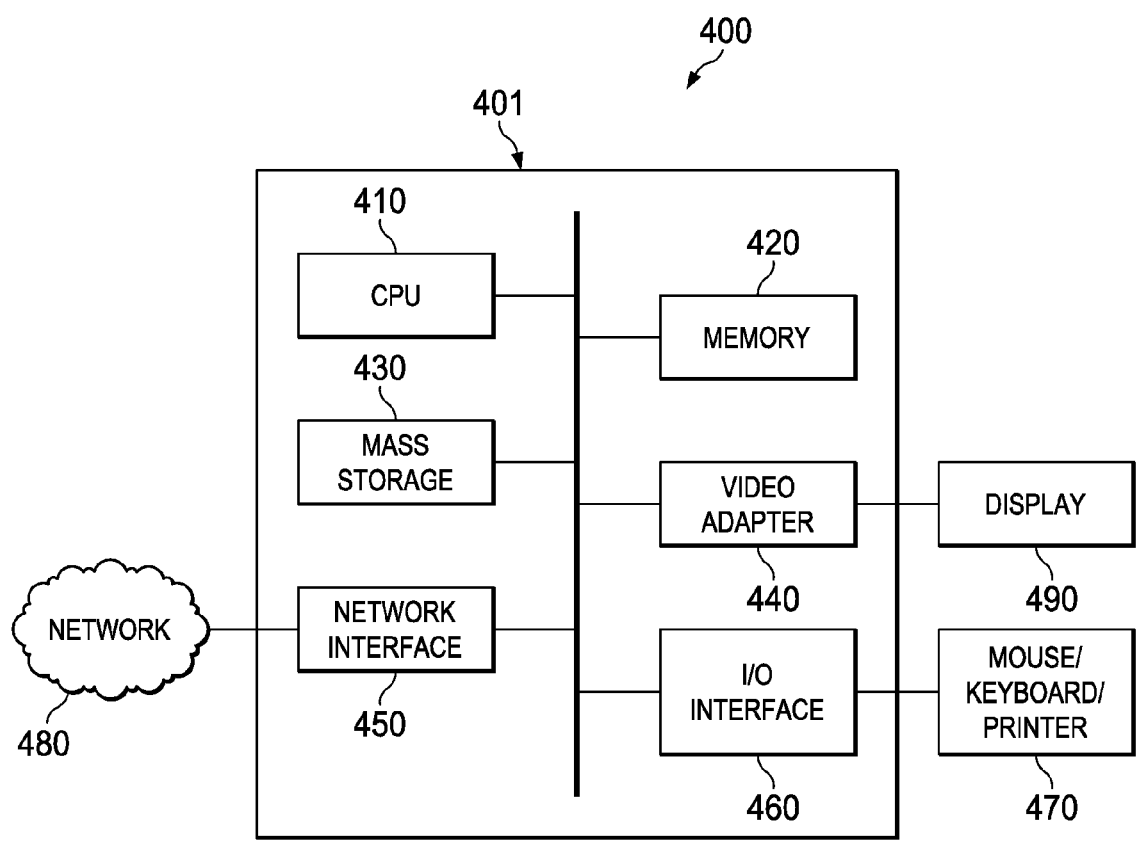
FIG. 4 is a block diagram of a processing system that can be used to implement various embodiments.

FIG. 4 is a block diagram of a processing system 400 that can be used to implement various embodiments. Specific devices or UEs may utilize all of the components shown, or only a subset of the components, and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, a memory 420, a mass storage device 430, a video adapter 440, and an I/O interface 460 connected to a bus. The bus may be one or more of any type of several bus architectures including a memory bus or memory controller, a peripheral bus, a video bus, or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 460 provide interfaces to couple external input and output devices to the processing unit. As illustrated, examples of input and output devices include a display 490 coupled to the video adapter 440 and any combination of mouse/keyboard/printer 470 coupled to the I/O interface 460. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for providing differentiated association in a WiFi network, the method comprising:
    assigning different association priority classes to a plurality of stations (STAs) that share a channel of the WiFi network, wherein the STAs with higher association priority classes wait for shorter times before starting association with an AP over a shared channel, and wherein the STAs are separate physical devices that each communicate directly with the AP; and
    assigning to the STAs different minimum wait times or different time intervals for the different association priority classes according to different traffic types, wherein the STAs assigned higher association priority classes have shorter minimum wait times or earlier time intervals.

2. The method of claim 1, wherein the association priority classes are assigned by the AP or the WiFi network and signaled to the STAs.

3. The method of claim 1, wherein the association priority classes are assigned by the STAs and indicated to the AP or the WiFi network.

4. The method of claim 1 further comprising assigning different backoff time windows for the STAs according to the different association priority classes, wherein the STAs assigned higher association priority classes have smaller backoff time windows.

5. The method of claim 1, wherein the association priority classes are determined for the STAs according to traffic types or a highest priority application carried on each of the STAs.

6. The method of claim 1, wherein the association priority classes are determined for the STAs according to STA type or subscriber's priority.

7. The method of claim 1, wherein the association priority classes are determined by a random number generator.

8. The method of claim 1, wherein the association priority classes are determined for the STAs according to a weighted sum of traffic type, STA type or subscriber's priority, and generated random number.

9. The method of claim 1, wherein the association priority classes include a first class with highest priority association for STAs that need fast association, a second class for STAs with real time interactive traffic, a third class for STAs that tolerate longer association delays, and a fourth class for STAs with best effort traffic.

10. A method for providing differentiated association in a WiFi network, the method comprising:
    determining, at a station (STA), an association priority class assigned to the STA, wherein the STA is a single physical device assigned a single association priority class from a plurality of different association priority classes provided by the WiFi network, wherein the different association priority classes are allocated different minimum wait times or different time intervals according to different traffic types, and wherein higher association priority classes from the different association priority classes are allocated shorter minimum wait times or earlier time intervals;
    entering a sleep mode for a duration time corresponding to one of the different minimum wait times or different time intervals that is allocated to the determined association priority class; and
    starting an association procedure between the STA and an access point (AP) of the WiFi network after the duration time ends.

11. The method of claim 10 further comprising:
    detecting, at a media access control (MAC) layer, a change of traffic type in a buffer of the STA; and
    initiating a change of the association priority class for the STA according to the change of traffic type.

12. The method of claim 10 further comprising receiving, from an access point (AP), a change of association priority class for the STA according to changing traffic.

13. The method of claim 10 further comprising:
    generating a random number at the STA; and
    changing the association priority class for the STA if the random number is above or below a threshold.

14. The method of claim 10, wherein the association procedure is based on a carrier sense multiple access with collision avoidance (CSMA/CA) procedure.

15. The method of claim 10, wherein the association procedure is an enhanced distributed channel access (EDCA) procedure.

16. The method of claim 10, wherein the STA enters the sleep mode for a minimum wait duration corresponding to the association priority class of the STA.

17. The method of claim 10, wherein the STA enters the sleep mode for a time interval corresponding to the association priority class of the STA.

18. The method of claim 10, wherein the STA goes to sleep for a random wait time within a backoff time window corresponding to the association priority class of the STA.

19. The method of claim 10, wherein the STA goes to sleep for a random wait time within a difference of a backoff time window corresponding to the association priority class of the STA and a shorter backoff time window corresponding to a higher association priority class.

20. An access point (AP) component configured to support differentiated association in a WiFi network, the AP comprising:

a processor; and a non-transitory computer readable storage medium storing programming for execution by the processor, the programming including instructions to:

assign different association priority classes to a plurality of stations (STAs) that share a channel of the WiFi network, and assign different minimum wait times or different time intervals to the STAs with the different association priority classes according to different traffic types, wherein STAs of higher association priority classes wait for a shorter time before attempting association with an AP over a shared channel, and wherein the STAs are separate physical devices that each communicate directly with the AP.

21. The AP of claim 20, wherein the programming includes further instructions to change the assigned association priority classes to the STAs according to traffic or network conditions.

22. A station (STA) configured to support differentiated association in a WiFi system, the STA comprising:

a processor; and a non-transitory computer readable storage medium storing programming for execution by the processor, the programming including instructions to:

enter a sleep mode for a duration time corresponding to an association priority class assigned to the STA, wherein the STA is a single physical device assigned a single association priority class from a plurality of different association priority classes provided by the WiFi system, wherein the different association priority classes are allocated different minimum wait times or different time intervals according to different traffic types, wherein higher association priority classes from the different association priority classes are allocated shorter minimum wait times or earlier time intervals, and wherein the duration time corresponds to one of the different minimum wait times or different time intervals that is allocated to the association priority class assigned to the STA; and start an association procedure between the STA and an access point (AP) of the WiFi system after the duration time ends.

23. The STA of claim 22, wherein the programming includes further instructions to:

detect, at a media access control (MAC) layer, a change of traffic type in a buffer of the STA; and initiate a change of the association priority class for the STA according to the change of traffic type.

24. The STA of claim 22, wherein the programming includes further instructions to:

generate a random number at the STA; and change the association priority class for the STA if the random number is above or below a threshold.

* * * * *